No. 731,943. PATENTED JUNE 23, 1903.
W. D. PERKINS.
APPARATUS FOR CONTINUOUS FRACTIONAL DISTILLATION
OF PETROLEUM.
APPLICATION FILED MAR. 10, 1903.
NO MODEL. 2 SHEETS—SHEET 1.
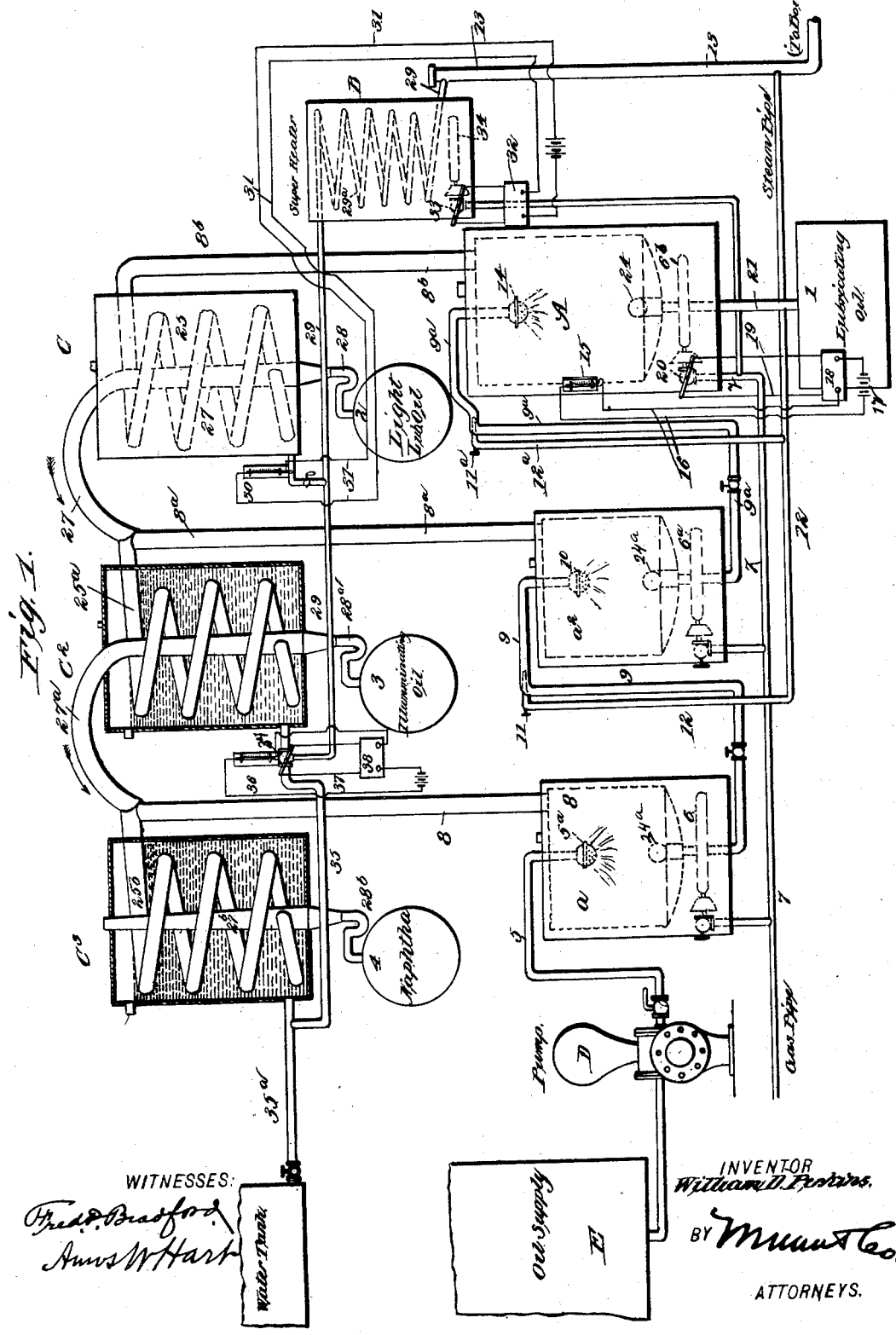

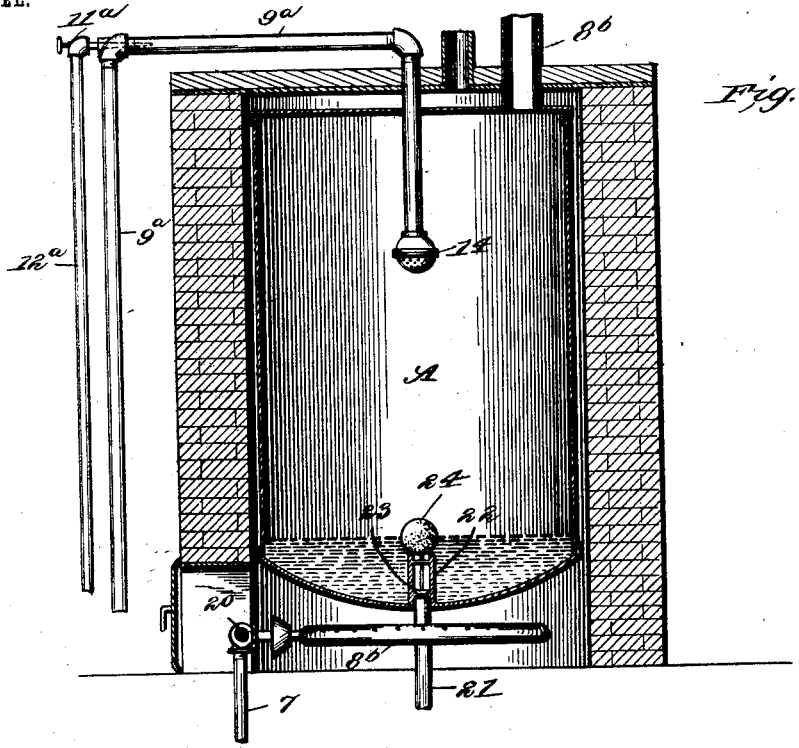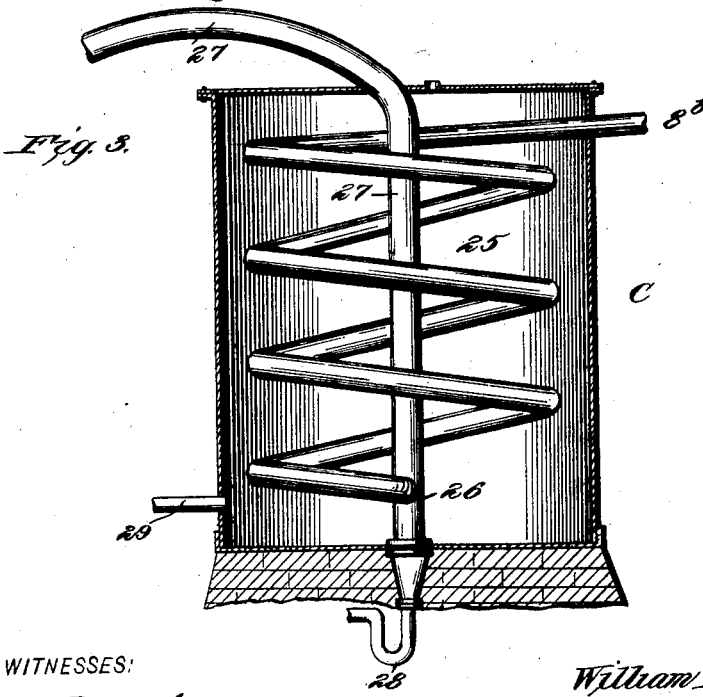

No. 731,943.

Patented June 23, 1903.

UNITED STATES PATENT OFFICE.

WILLIAM D. PERKINS, OF OIL CITY, PENNSYLVANIA, ASSIGNOR OF SIX-SEVENTHS TO GEORGE B. ATEN, FRANK M. THOMPSON, JAMES H. ATEN, LAURA B. WADE, THOMAS A. McINTOSH, AND JOHN M. KERR, OF WELLSVILLE, OHIO.

APPARATUS FOR CONTINUOUS FRACTIONAL DISTILLATION OF PETROLEUM.

SPECIFICATION forming part of Letters Patent No. 731,943, dated June 23, 1903.

Application filed March 10, 1903. Serial No. 147,085. (No model.)

*To all whom it may concern:*

Be it known that I, WILLIAM D. PERKINS, a citizen of the United States, residing at Oil City, in the county of Venango and State of Pennsylvania, have made certain new and useful Improvements in Continuous Fractional Distillation of Petroleum and Similar Hydrocarbons, of which the following is a specification.

With my apparatus I carry on in a most practical, rapid, and economical way a process of fractional distillation or separation and refining of certain hydrocarbons, particularly those of the marsh-gas series, commonly included under the name "petroleum," the same being continuously divided and separated into the products desired to be collected by exposing the liquid in a continuous flow first to a temperature such as will vaporize all the products except the heaviest one—that is to say, the one having the highest specific gravity—the operation of thus separating the liquid into two portions being effected within a "vaporizer," hereinafter more fully described, from the bottom of which the liquid or unvaporized portion—*i. e.*, heaviest product—thus continuously separated flows by gravity through a pipe connecting with a suitably-placed receiving-tank, and the vaporized portion, composed of all the lighter products mixed together, is conducted from top of vaporizer to the first of a series of condensers, which are maintained at different temperatures, according to products it is desired to collect separately. Thus the first condenser of the series is maintained at the temperature known to be just low enough to condense the vapors of the heaviest of the products to be separated, and this temperature is neither allowed to become lower or higher, and therefore the product condensed in this way is separated from other products and collects in a trap, from which it flows by gravity through a connecting-pipe into a receiving-tank. The temperature, as above stated, will permit the remaining products to pass through this condenser in vapor form and through a connecting-pipe to the next condenser of the series, differing from the first only in regard to the temperature at which it is maintained. It is evident that if the operation before described is repeated or similarly carried out at a lower temperature the remaining heaviest product will be condensed, and so on at successively lower temperatures, corresponding to the products to be separated. The operation is simultaneous and continuous as long as a supply of oil is kept up in the vaporizer or still, and this operation is greatly facilitated by the coaction of a series of auxiliary heaters, through which the oil under treatment reaches the vaporizer, it being preliminarily heated therein, so that it will be at or near the temperature maintained within the vaporizer when it reaches the latter. These heaters are generally of a number corresponding to the condensers, one for each of the latter, and each is directly connected with the approximate condenser. The temperature of the first heater is a little higher than the temperature of the last condenser of the series, to which it is directly connected. The oil is pumped into the first heater through a pipe terminating in a spraying or atomizing device and from said heater is forced into the second heater through a pipe by operation of an injector-like device, and the oil is similarly conducted from the last heater and intimately mixed with steam of proper temperature by means of an injector and sprayed into the vaporizer or still. The heaters raise the oil to the desired temperature, and what portion may be vaporized in them is conducted to and condensed in the proper condenser, thus greatly increasing the capacity of the vaporizer and the apparatus as a whole.

The details of construction, arrangement, and combination of parts comprising my improved apparatus are as hereinafter described, reference being had to the accompanying drawings, in which—

Figure 1 is mainly a diagrammatic view of the entire apparatus, portions being shown in section for better illustration of the interior construction. Fig. 2 is an enlarged vertical section of the main distilling and separating vessel, which is ordinarily termed the "vaporizer." Fig. 3 is an enlarged vertical central section of one of the condensers.

For the sake of more ready comprehension of the main parts or features of the apparatus I will preface the detailed description of the invention by a general one.

Referring to Fig. 1, A indicates the main distilling vessel, termed the "vaporizer," whose interior construction and attachments are fully illustrated in Fig. 2. The oil to be treated is taken from a supply-tank E by the pump D, which delivers it into a primary or auxiliary heater $a$ and passes through the series, as described hereinafter, the temperature in each heater being higher than within its predecessor, and the oil therefore reaches the vaporizer A at or nearly at the temperature desired. C $C^2$ $C^3$ indicate three vessels which are constructed and adapted to serve as condensers and are also provided with heating attachments to preserve them at a certain temperature. These condensers serve to successively treat the vapor product received from the vaporizer A. The temperature is highest in A and successively lower in C, $C^2$, and $C^3$. The several vessels A C $C^2$ $C^3$ are provided with tanks or receivers 1 2 3 4, respectively, for the heavy products separated in each—namely, a heavy lubricating-oil, a light lubricating or paraffin oil, illuminating-oil, and naphtha, which is a general term for several light products of petroleum. It will be understood that the number of heaters and condensers may be increased, if desired.

The oil taken from the tank E is forced by a pump through a pipe 5 and delivered into the first primary or auxiliary heater $a$ by a nozzle $5^a$, by which it is sprayed or atomized. The heater $a$ consists of an exterior body and an inclosed portion forming the heater or oil-receptacle proper. Beneath the same is arranged a gas-burner 6, (shown in dotted lines, Fig. 1,) to which gas is conducted from a main supply-pipe 7. The temperature in this heater is maintained, preferably, above 80° Fahrenheit, and part of the lighter portion of the product is driven off in the form of vapor through the pipe 8, which connects with the last condenser $C^3$. The remaining unvaporized products pass off by a pipe 9 through the bottom of the heater and are delivered into the second primary or auxiliary heater $a^2$ through its nozzle 10. This is accomplished by means of an injector 11, to which steam is applied at a proper temperature through pipe 12 from the main steam-pipe 13, which will be in practice connected with a boiler. The second heater $a^2$ is kept at a temperature—say above 212° Fahrenheit—such as vaporizes a higher product, and a part of the heavy product will be here vaporized and passes through pipe $8^a$ to the condenser designed to collect this product. It will be seen that this heater $a^2$ is provided with a gas-burner $6^a$, which is supplied, like that of the first heater, from the gas-pipe 7. The heavy unvaporized portion of the product is taken off by the pipe $9^a$ and delivered through nozzle 14 into the vaporizer A, said pipe $9^a$ being provided with an ejector $11^a$, to which steam is supplied by pipe $12^a$, as shown.

Each heater is provided with a float and valve, as indicated by dotted lines at $24^a$, for regulating depth of oil in the heater. The details of construction and arrangement of such float and valve will be the same as the float and valve 24 illustrated in Fig. 2 in connection with the vaporizer A and hereinafter described.

The temperature in the vaporizer or still A is maintained above 300° Fahrenheit or between 300° and 600°, according to the kind or quality of the oil being treated. Heat is supplied by means of a burner $6^b$ in the same manner as for the auxiliary heaters $a$ $a^2$, gas being fed to it from the pipe 7 in the same manner. The temperature is regulated by an electrical thermostat which may be suited for the purpose. In the present case it is represented by a mercurial tube 15, with whose ends conducting-wires 16 are connected, the same extending, respectively, to a battery 17 and the thermostat proper, 18, which is in turn connected by wires 19 with a valve 20, located in the gas-pipe 7 adjacent to the burner $6^b$. It will be seen that when the temperature is such as to cause the mercury in the tube 15 to rise to a predetermined height the circuit through wires 16 will be completed and the thermostat 18 thereby operated so as to partly close the valve 20, and thereby correspondingly cut off or arrest the flow of gas to the burner $6^b$. The temperature in the vaporizer A is, in fact, such that all but the heaviest portion of the product will be vaporized and driven off through pipe $8^b$ to the first condenser C, the heavy product, which is a heavy lubricating-oil, descending by pipe 21 to the tank 1. As shown in Fig. 2, the metal body of the vaporizer A is inclosed in a brick structure, and the bottom thereof is provided centrally with a short stand-pipe 22, in which is arranged a valve 23, having a float 24 attached. The stem of the valve works in suitable guides, and whenever the height of the oil is sufficient the float is raised and the oil escapes through the pipe 22. On the other hand, when the height of the oil or heavy product falls below a point where the weight of the float and valve is not sustained the valve closes automatically, so that a certain quantity of oil or undistilled product will always remain in the vaporizer. The construction of the several condensers and heaters C $C^2$ $C^3$ is in most respects the same. In Fig. 1 the condensers $C^2$ $C^3$ are shown in section. Fig. 3 illustrates an enlarged section of the first condenser C. The light or vaporized product received from the vaporizer or still A through the pipe $8^b$ enters a worm or coil 25, arranged within the metal body of the first condenser C, and descends to the lowest point 26, where it joins a vertical pipe 27. In this coil a separation takes place between the heavier and lighter products of the vaporized product received from the still A, the heavier portion, which is a light lubricating or paraffin oil, passing downward through the trap 28 into the receiver or tank 2 and the lighter or uncondensed portion of the vapor passing off by a pipe 27 into the coil $25^a$ of the second condenser $C^2$. The temperature of the first condenser C is maintained at 300° Fahrenheit or above, since it is desired to effect but little condensation in order that all that portion of the vapor from which illuminating-oil may be obtained shall pass over into the second condenser $C^2$ for further treatment. The space surrounding the coil 25 in condenser C may be supplied with steam from pipe 29, and admission of steam is regulated as desired by a thermostat 30, which will be further described. In the second condenser $C^2$ the temperature is maintained at 212° Fahrenheit or above by means of a thermostatic appliance similar to those before referred to. In the third and last condenser $C^3$ the temperature is maintained between 60° and 100° Fahrenheit by means that will be presently described. A steam-pipe 29 is connected with the main supply-pipe 13 and forms a coil $29^a$ in superheater B. The said pipe 29 is connected with each of the condensers C $C^2$, so that superheated steam may be discharged into the respective condensers under the regulation of the automatic thermostats. The mercurial tube or thermostatic member 30 of condenser C is connected by wires 31 with the thermostat proper, 32, which is in turn connected with the valve 33 of a burner 34, arranged in the superheater B. It is apparent by this connection of parts that the heat in the superheater B may be regulated corresponding to a predetermined degree and that consequently the temperature in the condenser C may be kept at the required degree—to wit, 300° Fahrenheit. The admission of steam from pipe 29 into the second condenser $C^2$ is regulated by a thermostat, which is adapted to operate a two-way valve 34, located at the junction of a water-supply pipe 35 and the steam-pipe 29. The mercury-tube 36 is connected by wires 37 with the thermostat proper, 38, from which wires extend to the lever of the valve 34. The pipe 35 is connected with another pipe $35^a$, which extends to a water-tank F. Thus water or steam or mingled water and steam may be admitted to the condenser $C^2$ as conditions require for the purpose of maintaining the temperature at 212° or above. No steam is admitted to the last condenser $C^3$, but water only, whose temperature is between 60° and 100°, as required for condensation of the last vapor product.

It will be seen that by the above-described apparatus the oil to be treated is heated preliminarily and a certain part of the lighter products driven off to the worms or coils of the appropriate condensers $C^2$ $C^3$, and the oil is heated to the desired degree as it passes into the main still or reservoir A, whose temperature is such as to effect vaporization of all but the products to be collected. These auxiliary heaters $a$ $a^2$ thereby form an important part or adjunct of the other portion of the apparatus, since in addition to vaporizing the oil to a certain degree they prepare it for treatment in the vaporizer A and greatly enlarge the practical capacity of the latter. In other words, by their use I am enabled to effect distillation more rapidly than would be practicable if the oil were simply delivered into the vaporizer A at a normal temperature. It will be seen, further, that the vaporizer A removes the heaviest product which will not vaporize at the temperature maintained therein and that the vaporized portion passes to the condensers, as before described. The oil is continually fed to the vaporizer, or first to the auxiliary heaters and then to the vaporizer, and in the subsequent operation there is a separation of heavy and light products continuously going on. In brief, I provide an improved apparatus by which the fractional distillation of petroleum or similar liquids is effected continuously and rapidly, so that several distinct products are obtained, the same differing in specific gravity and other qualities, as is well understood. The whole operation is practically effected automatically, it being only necessary to supply gas, water, and steam in the manner described.

Having thus described my invention, what I claim as new, and desire to secure by Letters Patent, is—

1. In an apparatus for continuous fractional distillation of petroleum and similar hydrocarbons, the combination of the vaporizer and a receiver for the unvaporized product, of condensers connected with said vaporizer, pipe-coils or worms in the several condensers, which are connected in series, receivers for heavy unvaporized products connected with the several worms, a steam-superheater and a pipe connecting it with two condensers appliances for the latter and the vaporizer, and thermostatic regulators for such heaters, substantially as shown and described.

2. In an apparatus for continuous fractional distillation of petroleum and similar hydrocarbons, the combination with the vaporizer, of auxiliary heaters arranged in series, means for feeding oil to the first heater, pipes connected with the bottoms of the heaters for conducting off unvaporized product, a steam-pipe having injectors arranged in the pipes having the unvaporized product, a gas-burner arranged beneath each heater and connected with a gas-supply, and automatic means for regulating escape of oil, the same consisting of a float and valve arranged in each heater, substantially as shown and described.

3. The combination with a vaporizer, and condensers connected in series therewith, these several vessels being provided with receivers for heavy or unvaporized products which are graduated in density, of auxiliary heaters having pipes for conducting off the vaporizable product, which pipes are connected with condensers in which nearly the same temperatures are maintained, means for feeding oil to one of the heaters and the unvaporized product from such heater to the next and from the second heater to the vaporizer, and heating appliances connected with the vaporizer and heaters, substantially as shown and described.

4. In an apparatus for the separation of petroleum and like liquids into fractional parts thereof, the combination of a vaporizer, means for conducting continuously away, by separate channels, vapors and unvaporized products, and a receiver for product of vaporizer, a series of condensers, each connected directly to one of a series of heaters and condensers connected to receiver to condense vapors from vaporizer, heaters connected together and to condensers, whereby oil under treatment passes through the heaters from one to the next and into vaporizer, means for supplying the oil to heaters, and means for atomizing within heaters and vaporizer, as shown and described.

WILLIAM D. PERKINS.

Witnesses:
SOLON C. KEMON,
AMOS W. HART.